Nov. 13, 1928.
H. A. FOOTHORAP
1,691,236
FLAT PLATEN TYPEWRITER
Filed May 3, 1924 — 9 Sheets-Sheet 5
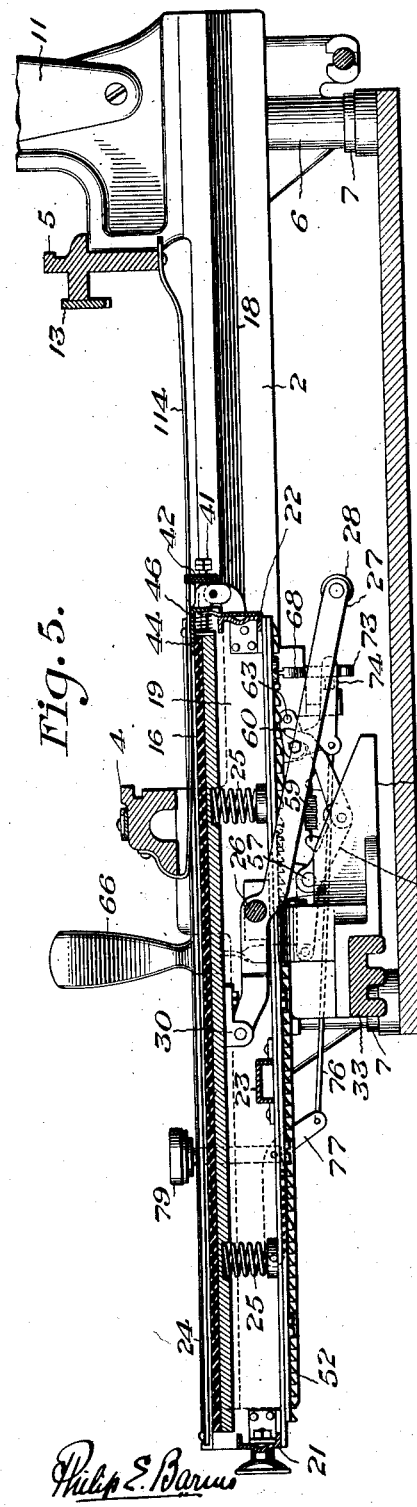
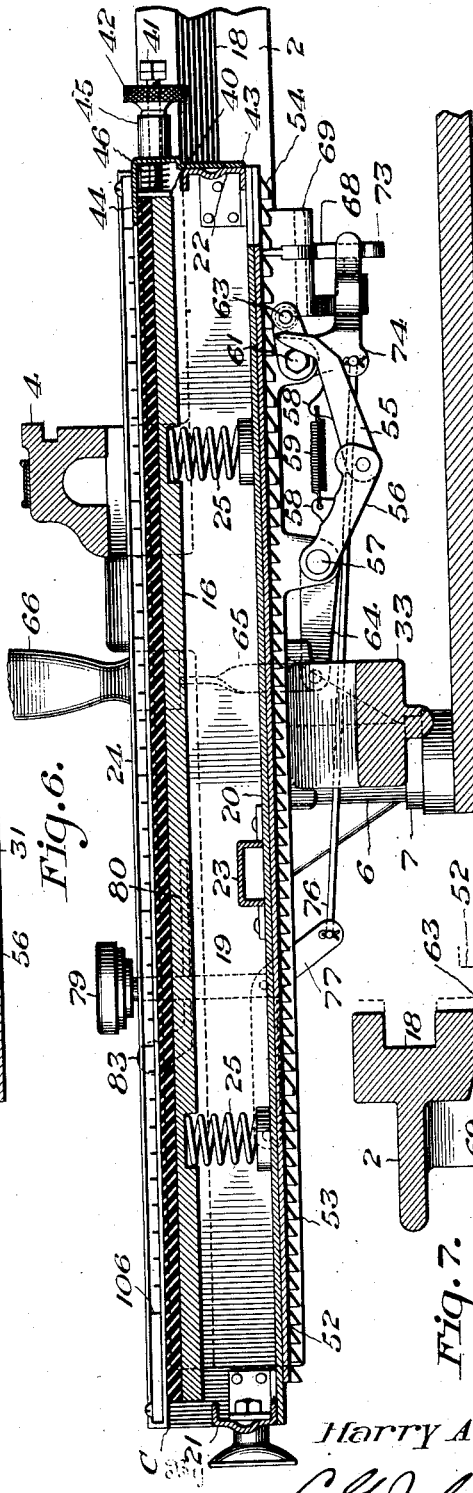
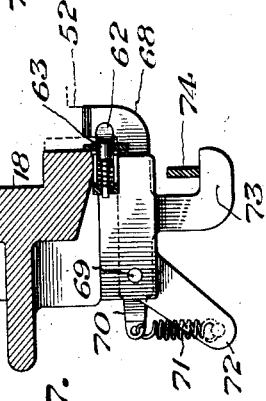
Inventor
Harry A. Foothorap

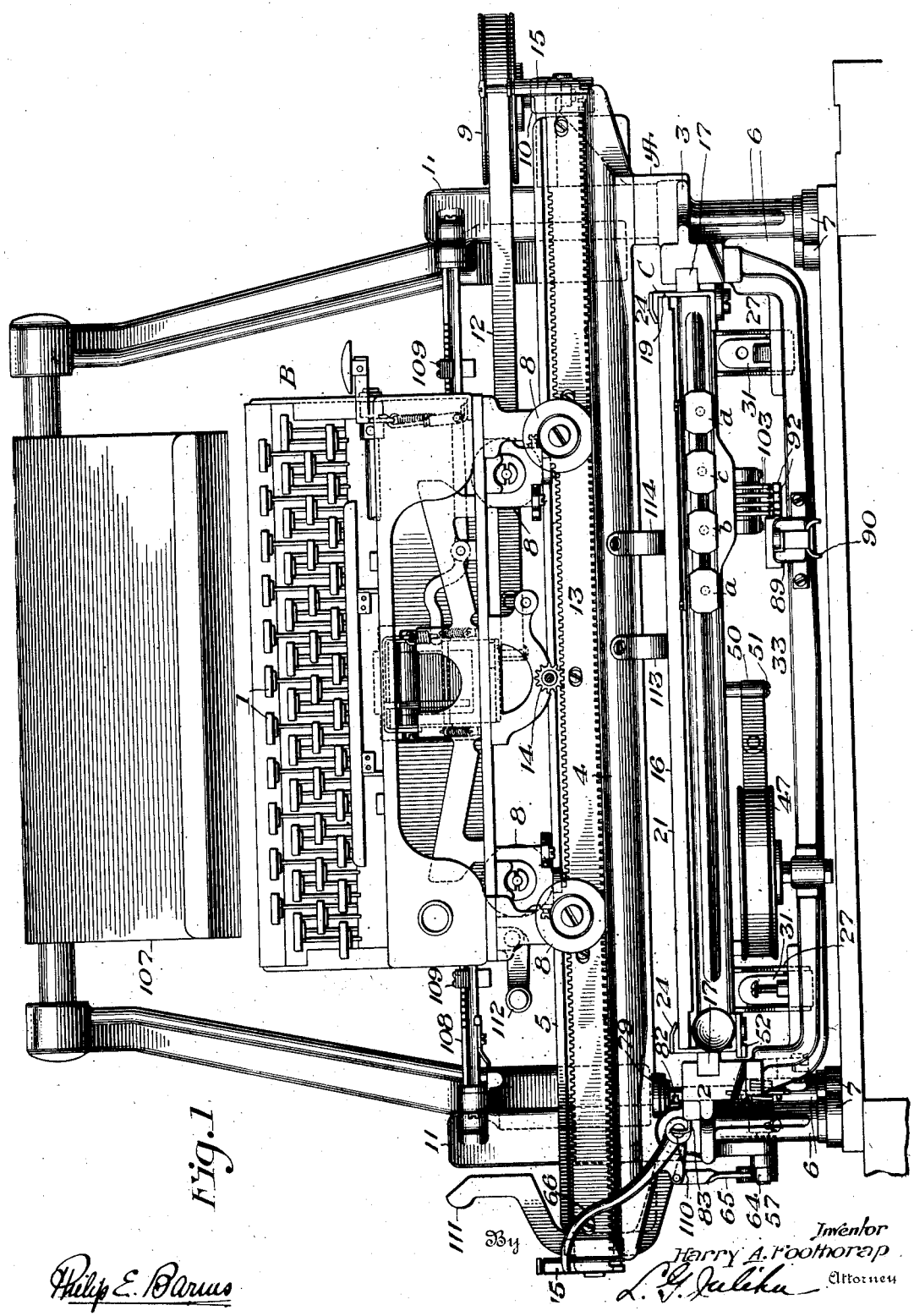

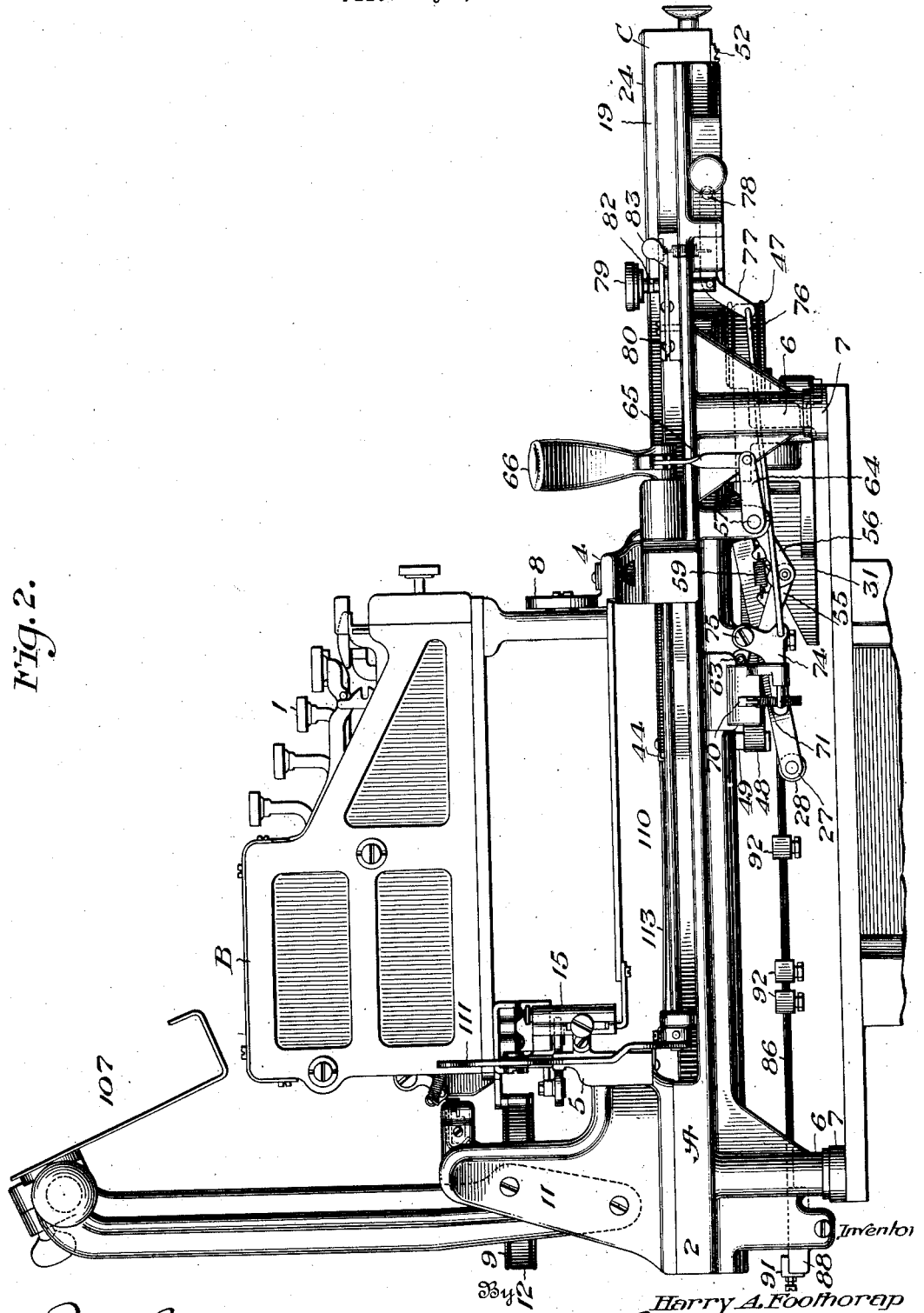

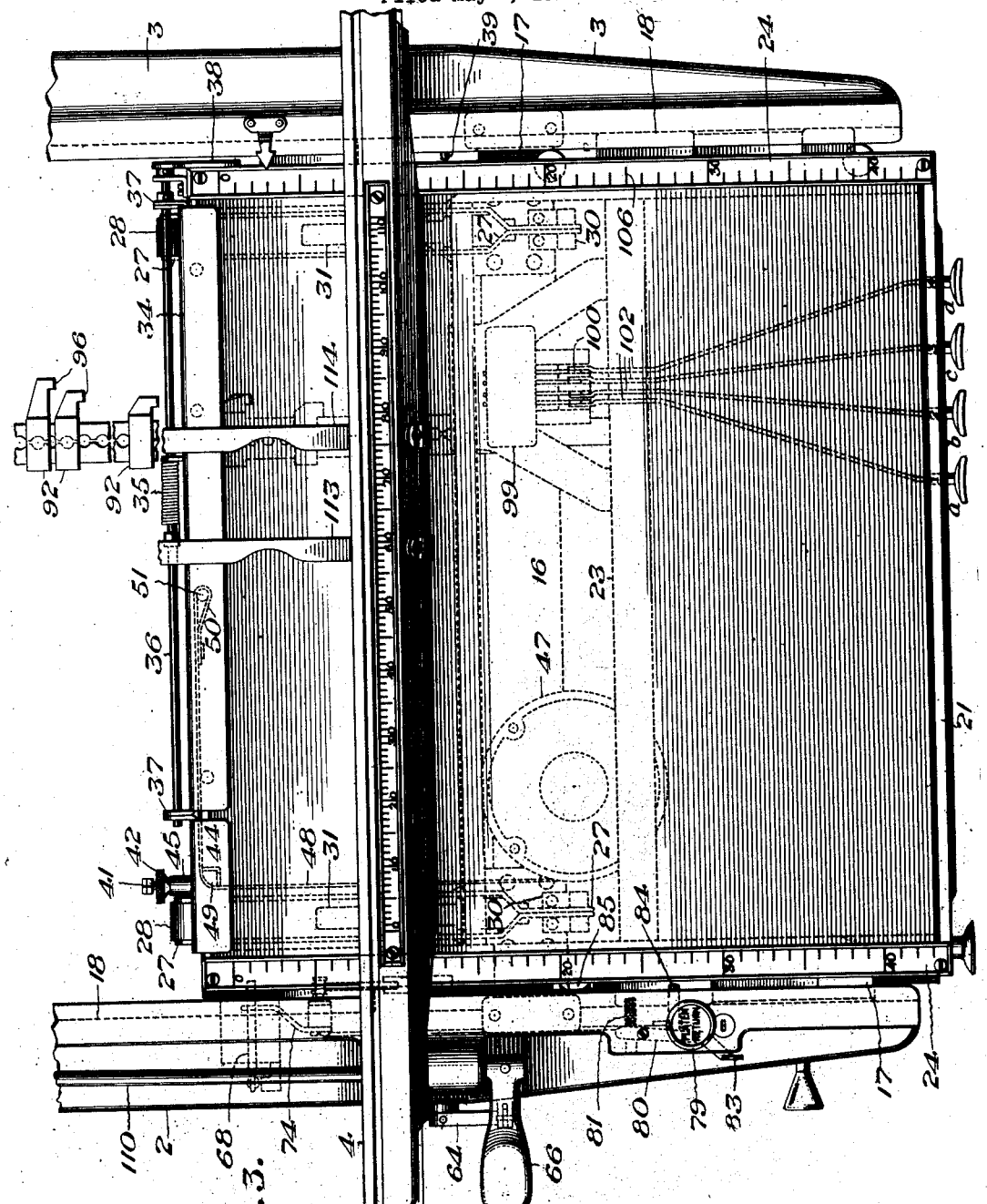

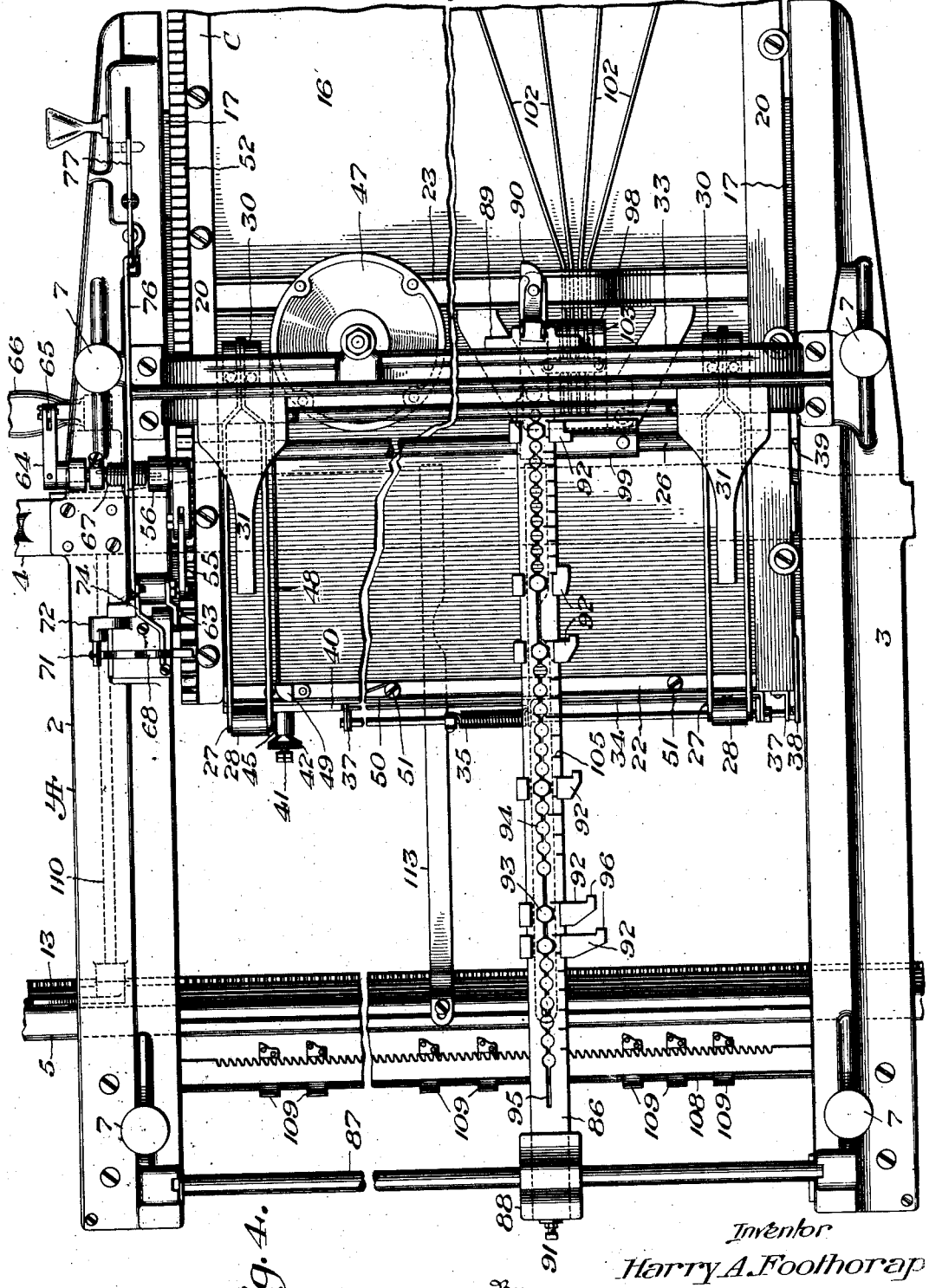

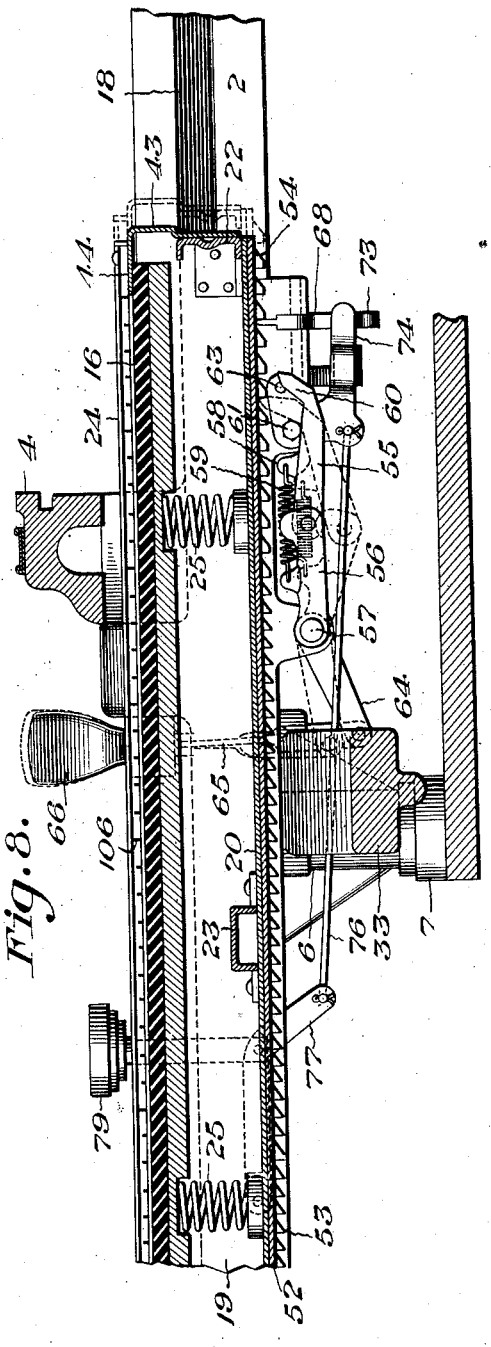
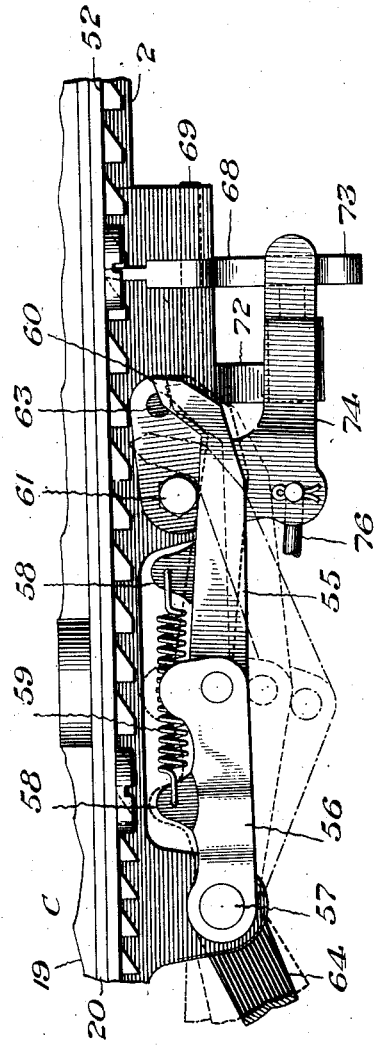

Nov. 13, 1928.
H. A. FOOTHORAP
FLAT PLATEN TYPEWRITER
Filed May 3, 1924
1,691,236
9 Sheets-Sheet 7
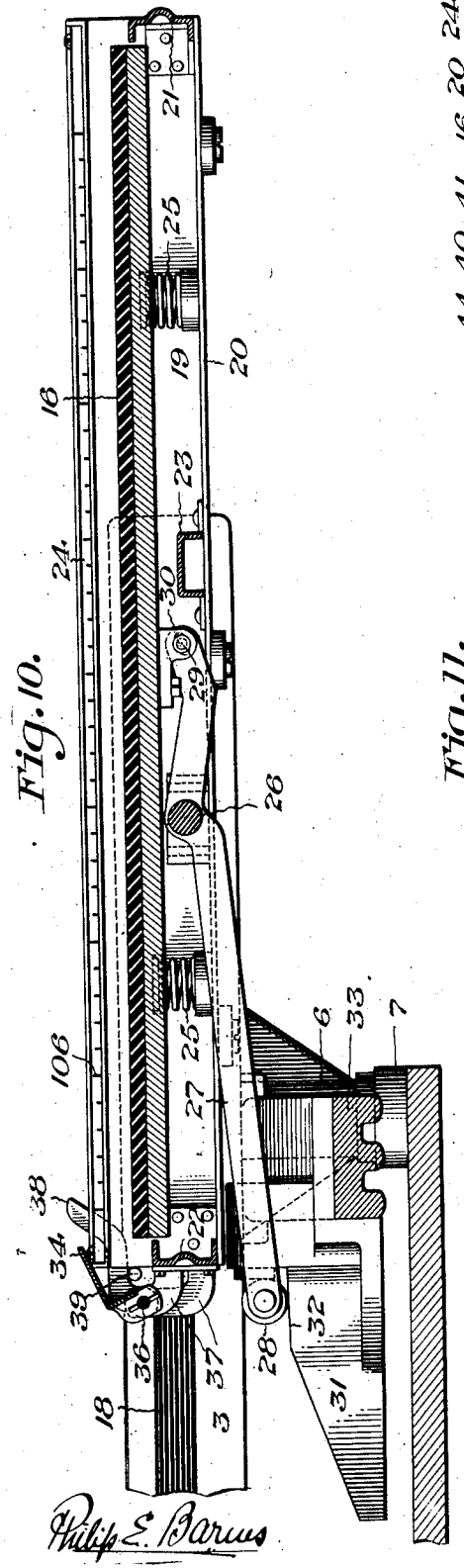
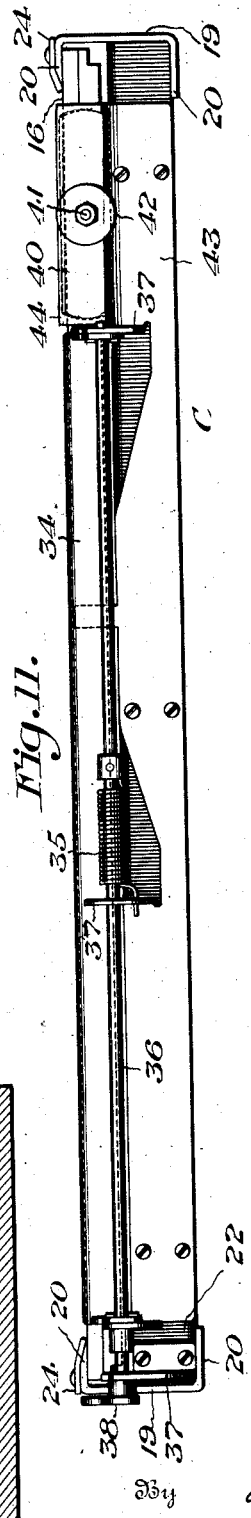
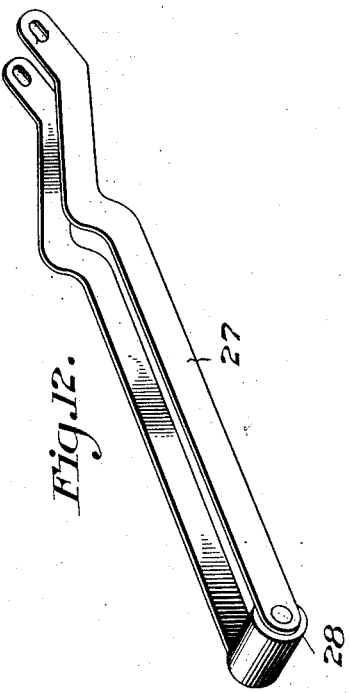
Inventor
Harry A. Foothorap

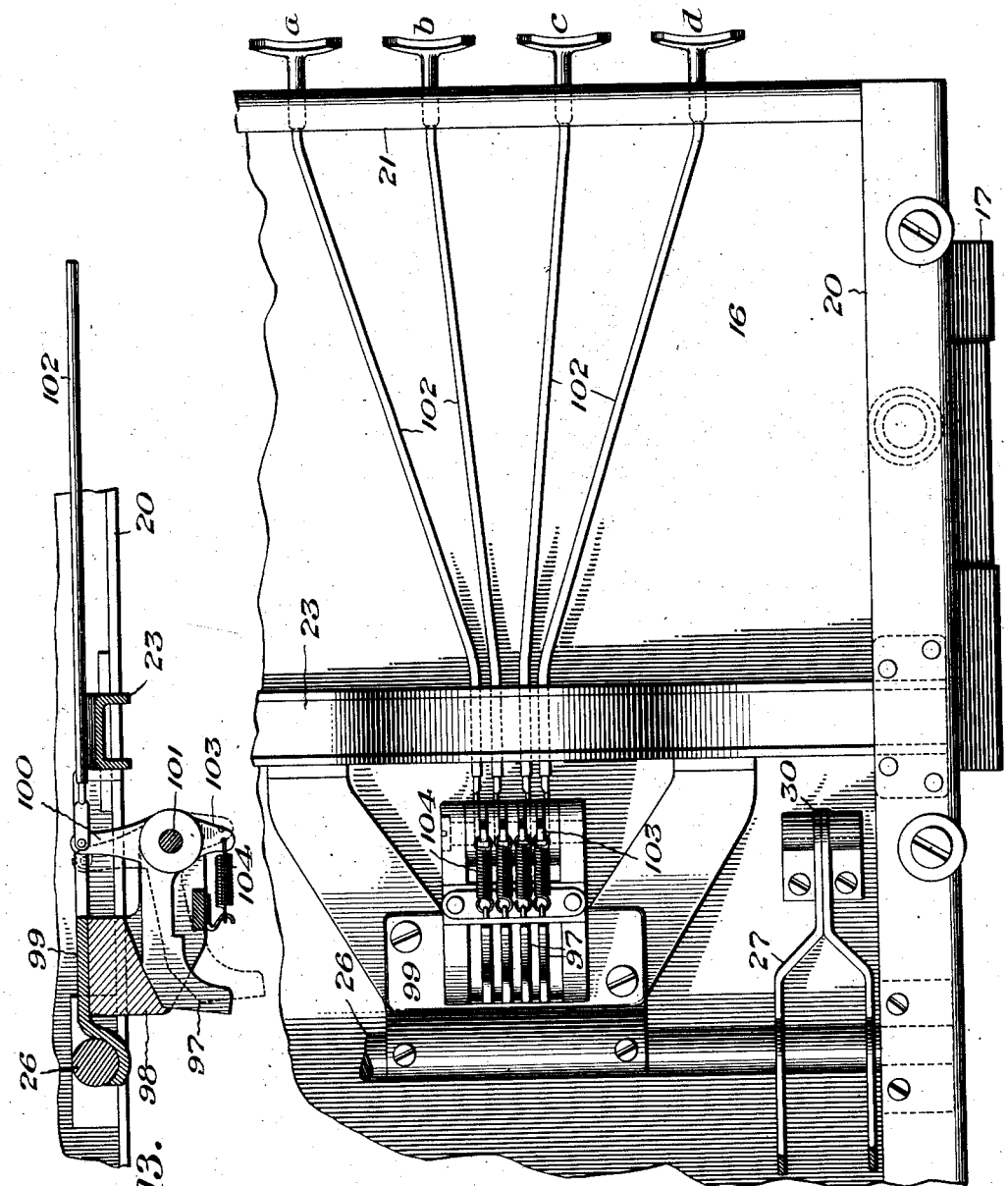

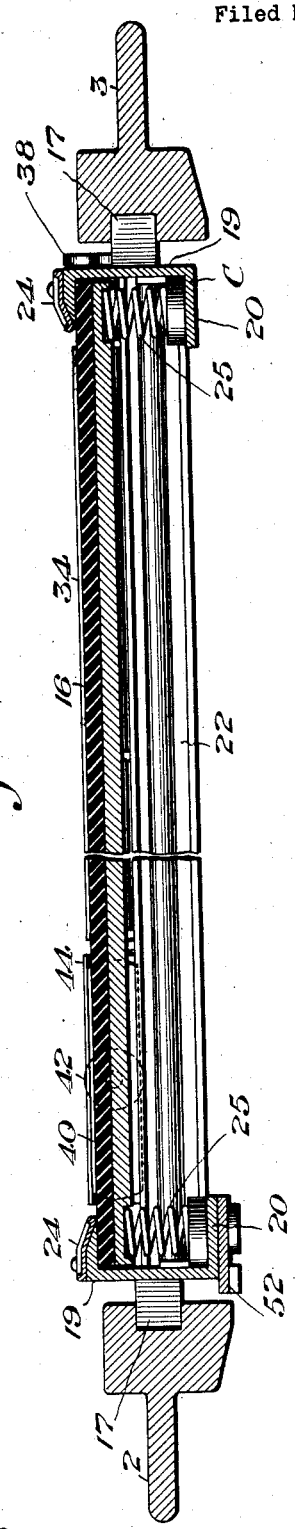
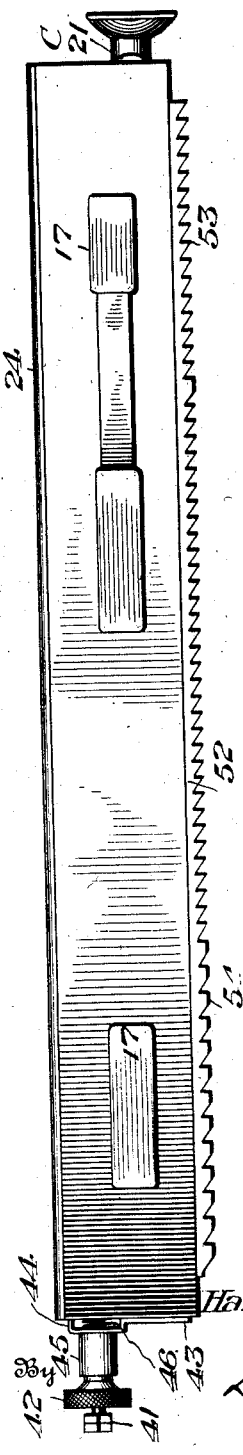

Patented Nov. 13, 1928.

1,691,236

UNITED STATES PATENT OFFICE.

HARRY A. FOOTHORAP, OF HARRISBURG, PENNSYLVANIA, ASSIGNOR TO ELLIOTT-FISHER COMPANY, A CORPORATION OF DELAWARE.

FLAT-PLATEN TYPEWRITER.

Application filed May 3, 1924. Serial No. 710,804.

This invention relates to a portable movable platen for typewriting machines of the flat platen type and to a platen equipment including means for retaining the work sheets on the platen and means for moving the platen and for controlling the platen movements.

One object of the invention is to provide in a light portable structure, a platen supporting frame and a platen, the platen being capable of depression to release the work for adjustment and replacement and having two bodily movements in its supporting frame, one being a line space movement to accommodate the line arrangement of the work and the other being a free movement to present the work in position for displacement, replacement or adjustment by the operator.

Another object is to equip a platen of the character specified with means whereby the movement of the platen to various positions in the frame will effect the automatic control of the work holding or clamping elements.

Still another object of the invention is to provide for both automatic line spacing of the platen through the return of the carriage to its normal writing position and manual line spacing of the platen independently of the position of the carriage.

Still another object of the invention is to provide a platen of this general character with line space tabulating mechanism whereby when the mechanism has been once adjusted or set up for a given line arrangement of work, successive positions of the platen in the line space direction may be quickly secured by the manipulation of a line space tabulator key.

Still other features and objects of the invention will hereinafter appear.

In the accompanying drawings:

Fig. 1 is a front elevation of a typewriting machine embodying my invention.

Fig. 2 is a side elevation thereof.

Fig. 3 is a plan view of the platen shown in its forward position and with the rear end of the supporting frame broken away.

Fig. 4 is a bottom plan view.

Fig. 5 is a longitudinal section.

Fig. 6 is a similar view on somewhat enlarged scale with certain of the parts omitted.

Fig. 7 is a detail view of a portion of the line space mechanism.

Fig. 8 is a sectional view generally similar to Fig. 6 showing the line spacing mechanism in a different period of operation.

Fig. 9 is an elevation of the line space mechanism on an enlarged scale with progressive positions of the line space toggle indicated by means of full and dotted lines.

Fig. 10 is a longitudinal section designed more particularly to show an operation of the platen depressing mechanism.

Fig. 11 is an elevation of the rear end of the platen.

Fig. 12 is a detail view of one of the platen depressing bails.

Fig. 13 is a sectional elevation designed to show the construction and arrangement of the key operated line space tabulator stops.

Fig. 14 is a bottom plan view, more particularly of the line space tabulating mechanism.

Fig. 15 is a transverse section of a portion of the platen frame and the main frame, and Fig. 16 is a side elevation of the platen frame.

It may be premised that while the platen and platen equipment herein shown may be utilized wholly or in part in any relation calling for the support, movement and manipulation of one or more sheets, this specific embodiment of the invention has been designed with reference to its incorporation in what is known as the Elliott-Fisher billing and bookkeeping machines.

In machines of this type the work elements are supported in a flat spread out condition on a flat platen over which is mounted the printing mechanism which operates in a downward direction. This printing mechanism is mounted on a movable carriage which travels transversely of the platen to letter space the characters printed one by one. Ordinarily this movable carriage is in turn supported by a line space frame which is movable longitudinally of the platen to space the lines of writing on the work sheet carried by the relatively stationary platen.

The most distinct departure of the present invention from the usual arrangement and relation of the machine elements just described is the elimination of the movable line space frame supporting the printing carriage and the substitution therefor of a platen which is movable bodily relative to the transverse supporting frame for the carriage. Thus, the present arrangement is characterized by printing mechanism which moves in a letter spacing direction and a work supporting platen which moves in a line spacing direction. With this general understanding of the principal variation of this invention from the well known relation of the primary elements of machines of this class we may proceed with the more specific disclosure.

Referring first, more particularly, to Figs. 1, 2 and 3 the normally stationary unit of the portable structure may be termed the main frame A on which is mounted a laterally movable carriage B and in which is mounted a longitudinal movable platen frame C. The carriage B, both in construction and major equipment, is standard and includes printing mechanism embodying downwardly striking type bars and the usual printing keys 1 by means of which the type bars are actuated and the letter space movements of the carriage are controlled. This carriage is also equipped with the various auxiliaries usual in this type of machines; as for instance, ribbon mechanism, special keys for release, spacing, etc.

The frame A is composed primarily of side bars 2 and 3 and front and rear carriage guide rails 4 and 5 rigid with the side bars, these transverse members being of sufficient stiffness to connect the side bars in a rigid frame structure which preferably has four or more supports 6 provided with rubber or other cushioning feet 7 to avoid injury to the desk or other polished surface on which the frame may be supported. The carriage guides 4 and 5 of the main frame support and guide the bearing rollers 8 of the carriage so that the latter may have smooth frictionless movement on the main frame under the impulse of carriage propelling mechanism which includes a spring drum 9 mounted on the substantially horizontal arm 10 extending from one of a pair of brackets 11 rising from the rear ends of the side bars 2 and 3 and serving as a means of attachment between said side bars and the rear transverse frame member to which they are or may be formed integral. The drum 9 is connected to the carriage as usual by a carriage propelling tape 12 tending constantly to pull the carriage toward the right but permitting its retraction toward the left upon the application of sufficient power to overcome the spring drum 9.

Brackets 11 also afford a convenient support for the feed rack 13 of the carriage feeding mechanism, having its upper edge toothed for engagement with the carriage feed pinion 14 (see Fig. 1) and its lower edge notched for the reception of the retaining devices on the carriage stops 15 adapted to be slid along the rack in the usual manner and retained in their adjusted positions to prevent movement of the carriage when the machine is moved and to limit the extent of movement of the carriage in use.

The platen frame or carrier C in which the platen 16 is mounted, is movable in the main frame, as heretofore stated, in a longitudinal or forward and back direction at right angles to the direction of movement of the carriage B. For this reason it is provided with fins or slides 17 extended along its opposite sides and received by longitudinal grooves or guideways 18 in the adjacent inner side faces of the side bars 2 and 3 of the main frame. The platen frame or carrier C is preferably a light metal structure consisting of side walls 19 having inturned horizontal flanges 20 and transverse members 21 and 22 connecting the side walls or members 19 at the front and rear ends thereof. The frame may be additionally stiffened by an intermediate transverse channel bar 23. Along the upper edges of the side walls 19 the platen carriage is equipped with longitudinal paper clamps 24 which extend inwardly over the edges of the platen 16 which is supported yieldingly against the clamps by platen supporting springs 25 interposed between the platen and the two bottom flanges 20 at opposite sides of the platen frame.

Obviously, the platen may be depressed by hand to release the work, it being merely necessary for the operator to bear down on the platen with sufficient force to overcome the springs 25. It is contemplated, however, to effect the automatic control of the vertical movement of the platen within its frame, and in the present embodiment of the invention this automatic control is governed by the position of the platen and its frame with respect to the main supporting frame of the machine. That is to say, the arrangement is such that when the platen moves to its extreme forward position, as shown in Fig. 10, an incident of this movement will be the automatic depression of the platen to release the work sheets which have been held between the platen and the paper clamps, and thus permit their removal, adjustment or replacement as desired.

The illustrated form of platen depressing mechanism includes a transverse shaft 26 mounted in the platen frame C and constituting the fulcrum of two platen depressing yokes 27 provided at their rear ends with rollers 28 and having at their front ends loose pivotal connection, as indicated at 29, to bearing brackets 30 secured to the under side of the platen. The rollers 28 of the platen depressing yokes cooperate with a pair of depressing cams 31 terminating in dwells 32 and extending rearwardly from a third transverse bar 33 of the main frame A. It will be apparent from Figs. 1 and 10 that this transverse frame member 33 is dropped a sufficient distance below the plane of the side members 2 and 3 of the main frame to accommodate the described platen depressing mechanism and various other elements of the structure to which reference will be made.

The operation of the platen depressing mechanism will be clearly understood from a comparison of Figs. 5 and 10. In Fig. 5 the normal or paper clamping position of the platen is shown. The rollers 28 of the platen depressing yokes 27 are out of cooperative relation with the cams 31. In Fig. 10 the platen has moved forward from the position shown in Fig. 5, thereby causing the rollers 28 to ride up the cams 31 thus depressing the platen and resting finally upon the dwells 32 and holding the platen depressed as long as it remains in the advanced position shown. As soon, however, as the platen frame is moved back the rollers 28 will leave the dwells 32 and travelling down the cams 31 will permit the springs 25 to elevate the platen and clamp the work securely.

In addition to the side clamps 24 a hinged paper clamp 34 is mounted at the rear end of the platen and overlies the edge thereof, as shown in Figs. 5 and 10, being normally held down upon the platen by a spring 35 encircling the shaft 36 and secured at one end to the shaft and at its opposite end to one of several bearing members 37 carried by the rear end of the platen frame and affording a bearing for the shaft. This swinging paper clamp 34, like the platen itself, is designed to be operated automatically and, as will be seen by reference to Fig. 10, the releasing of both the platen and the clamp occur at or about the same time, to wit, as the platen approaches the limit of its forward movement, since it is in this position of the platen that is is most accessible for the manipulation of the work sheets thereon. In order to swing the clamp 34 back and up a cam lever 38 is attached to one end of the shaft 36 and is normally so disposed that a fixed clamp operating pin 39 projecting inwardly from one side of the main frame A will be located in the path of the cam lever as the latter moves forward with the platen. As the platen approaches the limit of its forward movement the cam lever 38 rides on the pin 39 and is cammed up thereby to swing the paper clamp 34 to its paper releasing position, as shown in Fig. 10. While the clamp 34 may extend entirely across the rear end of the platen it is preferably of sufficient width to accommodate at one side thereof an adjustable work gauge 40. This work gauge 40 acts as an abutment for the rear edge of the work sheet when the latter is placed in position on the depressed platen. It is carried at the inner end of an adjustment screw 41 threaded for a portion of its length for engagement with a knurled head 42 and passed through a metal plate 43 from which the bearing members 37 of the shaft 36 are, or may be, bent up.

This plate 43 is bent into horizontal position above the work gauge 40 and the work when slipped to place is passed under this horizontal portion 44 of the plate 43 and against the gauge 40. Between the head 42 and the plate 43 is a sleeve 45 surrounding the screw 41 and fixed, if desired, to the plate 43 to elongate the bearing afforded the screw in the plate. The bore of the sleeve 45 is plain and the adjustment screw is movable longitudinally to adjust the position of the work gauge 40 forward and back.

Interposed between the gauge 40 and the plate 43 is a spring 46 which encircles the screw 41 and urges the gauge 40 forward to a position determined by the adjustment of the knurled head 42 carried by the screw and abutted against the rear end of the sleeve 45. Thus far we have seen how the general assemblage of the major units of the machine is accomplished, how the platen, its supporting frame and the work gauging and clamping means are assembled and how the movement of the platen frame within the main frame of the machine accomplished the automatic release of the work by the depression of the platen relative to the fixed paper clamps and by the swinging of the rear paper clamp away from the platen.

It is now in order to explain in what manner the movement of the platen frame within the main frame is accomplished and controlled.

Mounted on the intermediate frame bar 33 of the main frame A is a spring drum 47 upon which is wound a platen propelling tape 48 led around a guide 49 at the under side of the rear end of the platen frame and having a terminal loop 50 attached to any one of a series of pins 51. The drum 47 will be referred to as the platen propelling drum and it will be obvious that the series of pins 51 permit the ends of the tape to be secured at any one of a series of points and afford a convenient means of adjusting the tension of the platen propelling spring by the mere adjustment of the end of the tape. The drum 47 constitutes a motor which, when unopposed, will advance the platen from any position to the extreme advance position shown in Fig. 10. This advance movement of the platen is, in reality, retractile because the feed of the platen frame to effect the initial positioning of the work and the line spacing movement to properly separate the printed lines is in a rearward direction and tends to wind the motor spring of the drum 47 and to store therein the power required to move the platen frame quickly forward. The line spacing movement of the platen frame and platen in a rearward direction is accomplished by line spacing mechanism which includes a ratchet rack 52 extending along the under side of the platen frame at the left hand side thereof (see Figs. 4, 8 and 9). The teeth of this rack may be spaced equidistantly, but in the illustrated structure the teeth are arranged in a front series 53 and a rear series 54, the teeth 54 being spaced apart somewhat wider than the teeth of the series 53, the purpose being to provide somewhat wider spacing for the lines of the heading, for instance of a bill or the like, than for the lines of items or other matter printed below the heading.

Coacting with this rack is a spacing dog 55 pivoted at one end of an arm 56 extended from a rock shaft 57. At opposite sides of the pivotal connection between the arm 56 and the dog 55 are lugs 58 connected by a spring 59 which constantly exerts a tendency to draw the dog 55 into angular relation with the arm 56 which are, in effect, the jointed members of a toggle spacing dog. In the normal angular relation of the dog 55 and the arm 56 the angular engaging end 60 of the dog engages a stop 61, as indicated by the dot and dash position of these parts in Fig. 9. When the arm 56 is swung up toward the full line position in Fig. 9 the toggle is straightened, the first part of this movement serving to move the end of the dog into engagement with a tooth of the rack 52 and further movement causing the dog to move the rack and the platen the distance of one line space. During this feeding movement of the dog it engages the cam face 62 of a spring urged guide pin 63 which yields longitudinally to permit the passage of the dog and then springs back to its original position. The result of this operation is that when the dog moves out of engagement with the rack its angular end will be engaged by the pin 63 and compelled to remain out of engagement with the rack until it passes under the pin 63 and resumes its position in engagement with the pin 61. Therefore, the spacing dog will remain in engagement with the rack during the feed motion but will remain out of engagement with the rack during retraction instead of being dragged back over the teeth of the rack. The principal reason for this particular arrangement of the platen feeding mechanism, however, is to have the feeding mechanism normally entirely disconnected from the rack so that the platen frame and platen may be freely moved independently of this feeding mechanism, as will be hereinafter described.

A convenient form of operating device for the feed dog includes an arm 64 extended from the rock shaft 57 and connected by a link 65 with a line space lever 66 pivoted on the frame A at the left side thereof, as shown in Fig. 2. A line space retracting spring 67 coiled about the shaft 57 and having its ends appropriately secured serves to retract the line space mechanism. It will thus be seen that by depressing the line space lever 66 the platen frame or carriage may be fed rearwardly a step at a time. To prevent the platen frame from being drawn forward by the platen propelling drum after having been stepped back I provide a holding dog 68 pivoted at 69 and having a tail piece 70 connected to a spring 71 secured to a fixed part 72. The spring 71 yieldingly retains the holding dog 68 in its engaging position but allows it to yield when engaged by the inclined face of a rack tooth when the platen frame is moved rearwardly.

Obviously, in addition to the spacing or feeding means and the holding means the platen control must include releasing means whereby the platen may be wholly released when desired and allowed to be shot forward by the platen propelling drum, as for instance, when a given unit of work has been completed and it is desired to have the platen move forward to the position in which the sheets are removed, adjusted or replaced. Such releasing means merely necessitates the provision of an accessible device for withdrawing the holding dog 68 from the rack to effect the platen release. To this end the dog 68 is formed with a pendent hook 73 engaged by one end of an angular lever 74 pivoted at one end, as indicated at 75, and connected at its elbow or angle with a link 76, the forward end of which is in turn connected with the end of an angular lever 77 fulcrumed at 78 and connected at an intermediate point to the stem of a release key 79. By depressing the key 79 the lever 77 is swung downwardly imparting a similar motion to the lever 74 which by reason of its engagement with the hook 73 will withdraw the holding dog 68 from the rack 52 and thus release the platen for forward movement.

Under some conditions it is desirable that the release key be locked down when depressed. This is accomplished by providing a release lock 80 in the form of a lever urged by a spring 81 into engagement with a notch 82 in the stem of the release key 79 when said key is moved down far enough to bring the notch 82 opposite the lock. At the end of the release lock 80 is a finger piece 83 by means of which the lock may be withdrawn from the release key when desired to permit the holding dog 68 to return to its rack engaging position. In other words, the release lock may be manually operated to unlock the platen release mechanism and to effect the restoration of the platen control. It is also contemplated to effect the operation of the release lock automatically to permit the retraction of the release key. This end is attained by mounting a plunger 84 in the side member 2 with one end in engagement with the release lock 80 and its opposite end extended inwardly beyond the side face of the member 2 and into the path of movement of a cam 85 on the side of the platen frame (see Fig. 3). When the platen release key is depressed the platen is released in the manner described and the release key is locked down by the lock 80. If the lock has not been withdrawn before the forward movement of the platen presents the cam 85 to the plunger 84 said cam will move the plunger inwardly to disengage the lock 80 and allow the platen release mechanism to return to its normal position and thus restoring the platen to the control of the holding dog.

Next in order of description comes the line space tabulating mechanism whereby the platen may be arrested at selected points in its travel in one direction by the interference of tabulator stops. The tabulator stop bar 86 (see Fig. 4) is demountably but rigidly carried by the main frame of the machine, its rear end being supported by a transverse bar 87 and its front end by the bar 33, each of these bars having brackets 88 and 89 in which the bar 86 is seated and held in place by front and rear retaining devices 90 and 91. At intervals along the bar 86 are located stationary line space tabulator stops 92 suitably formed to fit the bar and held rigidly in position thereon by adjusting screws 93. To accommodate the screws 93 the bar 86 is formed with a longitudinal series of openings 94 which may be grouped as shown along the line of a longitudinal slit 95 in the bar. While the stops 92 may be of any desired form, they preferably have at the right hand side of the bar engaging faces 96 designed to be engaged by movable line space tabulator stops 97 pivoted in a bracket 98 secured to a plate 99 extending between and fixed to the bar 26 and frame member 23 of the platen frame. The movable stops 97 are of bell crank form, as shown in Fig. 13, one arm constituting the stop 97 and the other arm 100 extending vertically from the fulcrum 101 for attachment to the stems 102 of a series of four line space tabulator keys a, b, c and d.

Each of the stops 97 has a depending arm 103 to which is attached a spring 104 secured to the bracket 98 and serving to hold the stops 97 in elevated position and against a wall of the bracket 98. The keys a, b, c and d are exposed at the front end of the platen frame, their stems being suitably guided in the latter. It will be noted by reference to Fig. 4 that the stops 97 are arranged in a series extending transversely of the platen and in a plane beyond the right hand edge of the bar 86. This locates the movable stops in different longitudinal planes with reference to the platen travel so that if the stops 92 are of different lengths the engaging faces thereof will be located in the planes of movement of different stops movable with the platen. Obviously, therefore, the desired position of the platen may be selected by operating the appropriate line space tabulator key a, b, c or d to depress the appropriate stop 97 to its operative position, and by moving the platen rearwardly until the appropriate fixed and movable stops come into engagement to arrest the platen at the selected point. If the matter to be inserted at this point of the work sheet embraces more than a single line the platen will be fed rearwardly by the operation of the line spacing mechanism until it is desired to skip a portion of the work sheet before making the next entry. This free movement of the platen will be effected by the manipulation of a line space tabulator key as before.

The proper setting of the stops 92 is facilitated by a scale 105 on the bar 86 and a corresponding scale 106 extending longitudinally of the platen at one side thereof (see Fig. 10).

For the convenience of the operator a copy holder 107 may be carried by the frame A which also supports a letter space tabulator bar 108 carrying adjustable stops 109 which coact with key operated tabulator stops 100 mounted on the carriage in the usual manner. Normally the carriage B occupies a position at the left hand end of its travel and the platen occupies a forward position which makes its area accessible for the reception of the work sheet or sheets. In this forward position the platen is depressed so that the work sheets thereon will underlie the paper clamps. By placing the finger on one of the line space tabulator keys one of the movable tabulator stops is moved to its operative position and continued pressure on the key will move the platen back until arrested at that point at which it is desired to begin the making of a record on the sheet. Incidental to this positioning of the platen it will be automatically elevated against the fixed work clamps and the movable work clamp 34 will drop into place as the cam recedes from the pin 39. This rearward movement of the platen will wind the spring motor 47 which will be further wound as the platen is line spaced rearwardly by the line spacing mechanism or shifted to successive rearward positions by the manipulation of the line space tabulator mechanism.

When the record has been completed the operator depresses the platen release key 97. An optional feature of the structure is the provision for effecting the automatic line spacing of the platen upon the retraction of the carriage, this end being readily attained by the mere rearward extension of the shaft 110 of the line space lever 66 and the attachment to the rear end of the shaft of an automatic line space lever 111 which, upon the retraction of the carriage B, is engaged and swung by an actuated member 112 extended from the left hand side of the carriage (see Fig. 1).

An additional feature of my invention is the resilient downwardly bowed guards 113 and 114 which extend respectively between the guide rails 4 and 5 in the direction of the line spacing movement of the platen. These guards are adapted to exert a light pressure on the paper during such movement of the platen to smooth out any wrinkles or buckles which may have developed therein.

While the illustrated embodiment of my invention is thought to be preferable, it is obvious that many variations and modifications of its various structural features may be effected without material departure from the spirit of the invention as defined in the appended claims.

What I claim is:

1. The combination with a main frame, of a platen frame movable therein for line spacing, a platen mounted in the platen frame and movable to engage or release the work, line spacing mechanism for the platen frame, and automatic means for moving the platen through movement of the platen frame.

2. The combination with a main frame, of a flat platen movable therein for line spacing and also movable vertically to engage and release the work, means for retracting the platen, and means operative upon the retraction of the platen to move said platen vertically.

3. The combination with a main frame, of a reciprocatory platen frame carried thereby, a platen movable in the platen frame to engage and release the work, means for moving the platen frame in one direction, and means operated by much movement of the platen frame to move the platen in the platen frame.

4. The combination with a main frame, of a platen frame movable therein, a platen movable in the platen frame and yieldingly sustained in one position, and means operated by the movement of the platen frame in the main frame to move the platen in the platen frame.

5. The combination with a main frame, of a platen frame movable therein, a depressible platen mounted in the platen frame, a platen depressing cam carried by the main frame, and means carried by the platen frame and coacting with the cam to depress the platen.

6. The combination with a main frame, of a platen frame movable therein, a yieldingly sustained depressible platen mounted in the platen frame, platen depressing means operated by the relative movement of the main frame and the platen frame and including a pivoted member and a coacting cam.

7. The combination with a main frame, of a platen frame movable therein, a yieldingly sustained depressible platen mounted in the platen frame, platen depressing means operated by the relative movement of the main frame and the platen frame and including a pivoted member and a coacting cam, said pivoted member being mounted in the platen frame and said cam being supported by the main frame.

8. The combination with a main frame, of a platen frame movable therein, a depressible flat platen mounted in the platen frame for edgewise movement, and means operative, as the platen frame approaches one limit of its movement, to depress the platen.

9. The combination with a main frame, of a platen frame movable therein, a depressible flat platen mounted in the platen frame for edgewise movement, and means operative to depress the platen when the platen frame approaches one limit of movement and also operative to restore the platen to its elevated position as the platen frame recedes from said limit of movement.

10. The combination with a stationary main frame, of a platen edgewise movable therein, a work engaging member associated with the platen, and means for operating said work engaging member by the movement of the platen.

11. The combination with a main frame, of a flat platen edgewise movable in the frame, a work engaging member associated with the platen, and means operated by the movement of the platen in the main frame to move the work engaging member relative to the platen.

12. The combination with a main frame, a platen edgewise movable therein, a movable work clamp associated with the platen, and clamp operating means controlled by the movement of the platen in the main frame.

13. The combination with a main frame, of a platen edgewise movable therein, a movable work clamp associated with the platen, an operating cam, and means brought into coaction with the cam by the movement of the platen in the frame to swing the work clamp.

14. The combination with a line spacing rack, of a spacing dog movable to advance the rack, and a guide mounted to yield to permit the movement of the spacing dog in one direction but retaining the dog out of engagement with the rack during the retractile movement of the dog.

15. The combination with a frame, of a platen movable therein and under tension in one direction, a holding dog, means for operating the holding dog to release the platen, and means movable with the platen for restoring the dog to its platen holding position.

16. The combination with a movable platen under tension in one direction, a holding dog preventing movement of the platen in such direction, a release key operative to release the platen from the holding dog, means for locking the release key in its operated position, and automatic means for unlocking the release key in one position of the platen.

17. The combination with a movable flat platen, means for moving said platen in one direction, a holding dog for the platen, means for locking the holding dog out of action, and means movable with the platen for causing the holding dog to be restored to operative position.

18. The combination with a movable flat platen, of a holding dog therefor, a key for operating the holding dog, a lock for said key, and a cam movable with the platen to operate said lock.

19. The combination with a main frame, of a carriage movable thereon, a flat platen movable in the frame, and platen moving means operated by the carriage.

20. The combination with a main frame, of a platen movable therein in one direction, a carriage movable in another direction, and a line spacing mechanism operative to line space the platen and controlled by the carriage.

21. The combination with a main frame, of a platen and a carriage carried by the main frame and movable in different directions, line spacing mechanism for the platen, and both manual and carriage operated means for operating the line spacing mechanism.

22. The combination with a main frame, of a flat platen movable therein, and a tabulating mechanism for arresting the platen in predetermined positions.

23. The combination with a main frame, of a flat platen movable therein, and a tabulating mechanism including interfering stops and controlling keys.

24. The combination with a main frame, of a movable flat platen, line space tabulating mechanism including stops carried by the frame and platen respectively, and a key for moving one of said stops into interfering relation with another.

25. The combination with a main frame, of a flat platen movable therein, and a line space tabulating mechanism including a series of key operated stops and a coacting series of stops.

26. The combination with a main frame, of a flat platen movable therein, and a line space tabulating mechanism including a series of key operated stops and a coacting series of stops independently settable at various points in the direction of the platen travel.

27. The combination with a main frame, of a flat platen mounted to travel therein, a key operated stop movable with the platen, and a coacting stop carried by the frame.

28. The combination with a frame and a movable flat platen, of tabulating mechanism including a series of keys and key operated stops movable with the platen, and coacting stops carried by the frame.

29. The combination with a frame and a flat platen mounted to travel therein, of a key operated stop movable with the platen, a stop bar mounted on the frame, and a stop adjustable on the stop bar and arranged to coact with the key operated stop.

30. The combination with a main frame, of a flat platen mounted to travel therein, line space tabulating mechanism for the platen, said mechanism including a series of key operated stops movable with the platen, a stop bar carried by the frame, and a series of independently adjustable stops carried by the stop bar and arranged to cooperate with the key operated stops to arrest the platen in successive positions.

31. The combination with a main frame, of a flat platen mounted to travel therein, and tabulating mechanism including coacting stops and a key, said key being mounted on the front end of the platen to facilitate both the operation of a stop and the movement of the platen.

32. The combination with a main frame, of a movable platen, keys disposed along the front end of the platen and movable in a rearward direction to move the platen, and mechanism arranged to arrest the platen and controlled by the keys.

33. The combination with a main frame and a movable flat platen, of a series of keys each movable in the direction of the line space movement of the platen, and stop mechanism arranged to arrest the movement of the carriage and including stops controlled by the keys.

34. The combination with a main frame, of a flat platen movable therein, printing mechanism adapted to produce a printed record on the work sheet carried by the platen and letter space tabulating mechanism and line space tabulating mechanism, for tabulating the printed record in the direction of letter spacing and also in the direction of line spacing.

35. The combination with a main frame, of a platen movable therein, printing mechanism movable on the frame, tabulating mechanism for the platen, and tabulating mechanism for the printing mechanism.

36. The combination with a main frame, of a movable flat platen and movable printing mechanism both carried by the main frame, letter space tabulating means for the printing mechanism, and line space tabulating mechanism for the platen.

37. The combination with a main frame, of a flat platen movable therein, a motor for moving the platen and tabulating mechanism for arresting the platen at different points in the direction of line spacing.

38. The combination with a main frame, of a flat platen movable therein, a plurality of stops for arresting the platen in different line space positions and means for retracting the platen in the opposite direction.

39. The combination with a main frame, of a flat platen movable therein, tabulating mechanism including keys whereby the tabulating mechanism is made operative and the platen is moved in one direction, and a motor for retracting the platen in the opposite direction.

40. The combination with a main frame, of a platen frame movable therein for line spacing, a depressible platen mounted in the platen frame, and means whereby the movement of the platen frame in the main frame will cause the platen to be depressed from its normal writing plane.

41. The combination with a main frame, of a platen frame movable therein for line spacing, a platen mounted in the platen frame and movable therein toward and away from the writing plane, and means brought into action by the movement of the platen frame in the main frame to cause the platen to move in the platen frame.

42. The combination with a main frame, of a platen frame movable therein, a depressible flat platen mounted in the platen frame and normally located in the writing plane, and means brought into action by the movement of the platen frame in the main frame to cause the platen to be depressed when the platen frame approaches one limit of its movement and to cause the platen to be restored to the writing plane when the platen recedes from said limit of movement.

In testimony whereof I hereunto affix my signature.

HARRY A. FOOTHORAP.